(12) United States Patent
Kurabayashi

(10) Patent No.: US 6,341,855 B1
(45) Date of Patent: Jan. 29, 2002

(54) INK-JET RECORDING METHOD AND APPARATUS THEREOF

(75) Inventor: Yutaka Kurabayashi, Higashimurayama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/342,534

(22) Filed: Jun. 29, 1999

(30) Foreign Application Priority Data

Jun. 30, 1998 (JP) .............................. 10-185154
Jun. 9, 1999 (JP) .............................. 11-162340

(51) Int. Cl.⁷ .............................................. G01D 11/00
(52) U.S. Cl. ........................... 347/100; 347/15; 347/43
(58) Field of Search ............................. 347/15, 100, 43

(56) References Cited

U.S. PATENT DOCUMENTS

| 4,635,078 A | * | 1/1987 | Sakurada et al. ............. 347/15 |
| 5,142,374 A | * | 8/1992 | Tajika et al. .................. 347/43 |
| 5,614,007 A | | 3/1997 | Kurabayashi et al. ..... 106/22 R |
| 5,805,178 A | * | 9/1998 | Silverbrook .................. 347/15 |
| 5,835,116 A | | 11/1998 | Sato et al. ...................... 347/98 |
| 6,050,671 A | * | 3/2000 | Rotering ........................ 347/35 |
| 6,178,009 B1 | * | 1/2001 | Yamada et al. ................ 347/15 |

FOREIGN PATENT DOCUMENTS

| JP | 61-59911 B2 | 5/1979 |
| JP | 61-59912 B2 | 5/1979 |
| JP | 61-59914 B2 | 2/1980 |

\* cited by examiner

Primary Examiner—John Barlow
Assistant Examiner—Manish Shah
(74) Attorney, Agent, or Firm—Fitzpatrick, Cella, Harper & Scinto

(57) ABSTRACT

An ink-jet recording method capable of providing a record that has highly transmissible image density and a great maximum image density, a good tone and an excellent gradation. The ink-jet recording method uses different concentrations of black ink to make a graded record, wherein in addition to a set of inks employed for the graded recording, an ink containing a pigment or the like for increasing the maximum density after the recording on a recording medium is also applied to the recording medium.

16 Claims, 2 Drawing Sheets

MOVING DIRECTION OF CARRIAGE

INK-JET RECORDING METHOD AND APPARATUS THEREOF

BACKGROUND OF THE INVENTION

1. Field of the Invention

The present invention relates to an ink-jet recording method excellent in reliability and capable of giving a high image density. The present invention is appropriately applicable to a recorder (recording apparatus), in particular, one needed for a high image density on a light transmissible substrate for diagnosis in the medical field and for a reference picture, or the like.

2. Related Background Art

The ink-jet recording method is for the purpose of making a record by ejecting small ink drops and sticking ink to a recording medium such as paper. In particular, according to an ink-jet recording method disclosed in Japanese Patent Publication Nos. 61-59911, 61-59912 and 61-59914, or an ink-jet recording method in a process to generate liquid drops by using an electrothermal converter as ejecting energy supply means to give thermal energy to ink and create bubbles, making a recording head into high-density multi-orifices can easily be implemented and an image of a high resolution and high grade can be recorded at high speed.

As coloring materials in ink employed for the ink-jet recording method, water-soluble dyes are principally used. When printed on a light transmissible substrate at a high density, however, such water-soluble dyes exhibit a high transparency. Thus, an application to a high image density required field has a problem of having difficulties in yielding a maximum image density in comparison with an image density obtained by a wet silver salt process.

To overcome a problem related to water-soluble dyes as mentioned above, using a highly hiding coloring material such as dyes is considered. However, if a pigment, in particular carbon black, is employed as coloring material to obtain a high image density, another problem takes place that the so-called bottom color of the pigment is marked at the highlight part, the color tone becomes reddish meaning a high value of b* in CIE (L*a*b*) and no clean graded expression is obtained. Incidentally, here, CIE is an abbreviation of Comission Internationale de l'Eclairage.

SUMMARY OF THE INVENTION

Made to solve the above problems in the background art, the present invention takes a purpose in providing an ink-jet recording method capable of implementing a high transparent image density and a great maximum image density, a good tone and an excellent gradation.

The present invention for solving the problems is an ink-jet recording method by using a multiple sorts of black ink different in concentration to make a graded record, characterized in that a first type of ink employed for the above graded recording and a second type of ink containing a different coloring material from that of the first type and further increasing the maximum density expressible with the first type of ink on a light transmissible recording medium.

Besides, the present invention provides an ink-jet recorder for making a graded record by using multiple sorts of black ink, comprising first ink attaching means for attaching a first type of ink used for the above graded recording on a transmissible recording medium and second ink attaching means for attaching a second type of ink containing a different coloring material from that of the first type and further increasing the maximum density expressible with the first type of ink on a transmissible recording medium.

An ink-jet recording method and an ink-jet recorder according to the present invention are especially effective for the application to a transparent recording medium such as recording medium for the OHP.

Hereinafter, the background leading to the present invention will be described. First of all, when attaching ink to a transparent recording medium for the OHP, even when attaching ink containing a dye as coloring material to a recording medium for the OHP multiple times, there was difficulty with an increase in optical density (OD) and the density after a value of OD reaches about 2.5 could not be raised. Then, an attempt to use ink containing a pigment as coloring material instead of the dye ink succeeded in raising a value of OD up to about 3.5, but it was found that the hue was tinged with red brown in a relatively low density portion of an image and the image grade was not favorable.

Thus, it was found that on coloring portions other than the maximum density portion in the image with a dye ink and coloring the maximum density portion with a pigment ink capable of raising a value of OD higher than the dye ink, the problem of hue in portions other than the maximum density portion is solved and the OD value can be sufficiently raised at the maximum density portion, thus resulting in perfection of the present invention.

Besides, it was found to be attributable to a higher light scattering of pigment ink than that of dye ink that whereas use of dye ink could not raise a value of OD above a predetermined value, use of pigment ink could raise a value of OD still higher.

Like this, according to the present invention, a combined use of ink containing coloring materials different in light scattering for the grade recording on a recording medium enables a high grade image excellent both in hue and density to be obtained in the case of coloring a recording medium, especially a transparent recording medium.

DETAILED DESCRIPTION OF THE PREFERRED EMBODIMENTS

Hereinafter, the preferred embodiments of the present invention will be described.

Figure 1:
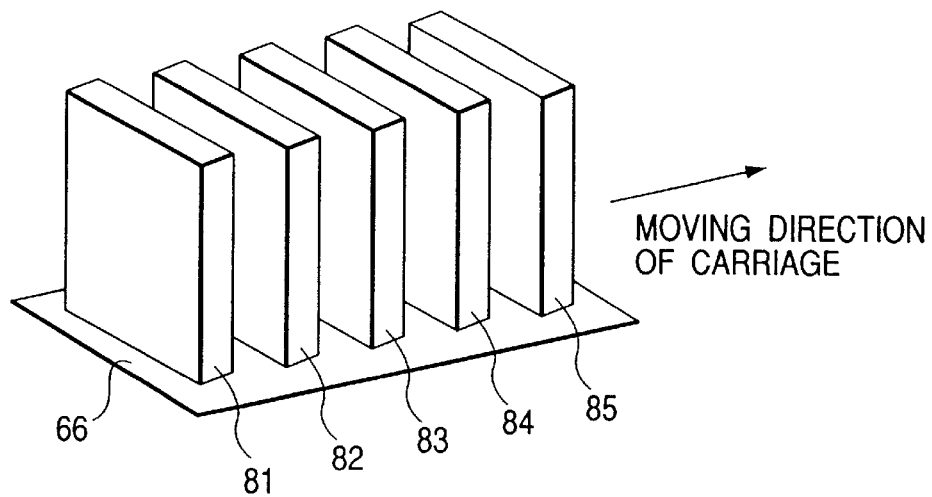
FIG. 1 is a perspective view showing a recording head array comprising a plurality of recording heads, usable for a recording method according to the present invention.

FIG. 1 is a perspective view showing a recording part comprising an array of recording heads. In FIG. 1, Numerals 81 to 84 denote ink jet recording heads for ejecting ink different in coloring material concentration (recording heads for the expression of a gradation). In general, the gradation is expressed by using these types of ink different in coloring material concentration, but in the present invention, an ink-jet recording head 85 for the ejection of ink for elevating the maximum density (maximum density elevating ink ejection head) is further used, thereby enabling a shortage of image density, especially light transmissible image density when using a dye ink and enabling the problem of hue when using a carbon black-containing ink to be solved especially by adjusting the hue at the low duty printing part, or the highlight part.

FIG. 1 shows the case where four types of ink different in coloring material density are used to execute a graded expression, but the number of ink types different in coloring material concentration is not limited to this. Besides, the difference of recording time between the maximum density elevating ink and the graded expression ink is also unrestricted. Furthermore, rather than an array of recording heads arranged in parallel, a recording head divided into five groups or so of vertical lines may be available.

Hereinafter, the details of graded expression ink and maximum density elevating ink (preferably carbon black-containing pigment ink) used in the present invention will be described.

As carbon black used in the present invention, carbon black manufactured, for example, by the Farnes method and Channel method is preferable which is 15 to 40 nm in primary particle diameter, 50 to 300 m$^2$/g in specific surface area according to the BET method, 40 to 150 ml/100 g in DSP oil absorbing amount, 0.5 to 10% in volatility and 2–9 in pH. Commercially available examples having these characteristics include No. 2300, No. 900, MCF 88, No. 33, No. 40, No. 45, No. 52, MA. 7, MA. 8 and No. 2200B (heretofore, available from Mitsubishi Chemicals Co.); RAVEN 1255 (heretofore, available from Columbia Co.); REGAL 400L, REGAL 330L, REGAL 660L and MOGUL L (heretofore, available from Cabot Co.); and COLOR BLACK FW-1, COLOR BLACK FW-18, COLOR BLACK S170, (COLOR BLACK S150, Prentex 35 and Prentex U (heretofore, available from DEGUSSA Co.), any of which is preferably usable.

In case of using carbon black as mentioned above, as its dispersant, water-soluble resins and surfactants employed so far as the dispersant of a pigment are usable without any problem.

As specific examples of water-soluble resins, those of 500 to 30000 in weight average molecular weight are preferable and those of 1000 to 15000 are further preferable. Specific examples of such surfactants may include a block copolymer, random copolymer or graft copolymer comprising two types or more of monomers, where at least one of them is hydrophilic monopolymer, selected from styrene and its derivatives; vinyl naphthalene and its derivatives; aliphatic alcohol esters of α, β-ethylene unsaturated carboxylic acids; acrylic acid and its derivatives; maleic acid and its derivatives; itaconic acid and its derivatives; fumaric acid and its derivatives; and vinyl acetate, vinyl pyrolidone, acrylic amide and their derivatives; or their salts. Alternatively, natural resins such as rhodan, shellac and starch can be also preferably used. These resins are soluble in an aqueous base dissolved solution and alkali-soluble type resins. Incidentally, these water-soluble resins used as pigment dispersant are preferably contained in a range of 0.1 to 0.5% by weight relative to the total weight of ink.

As regards carbon black, dispersant-unneeded types of those with oxidation-treated surface active groups or subjected to other surface treatment can be also used appropriately in the present invention. The surface of carbon black subjected to such a treatment is rich in carboxylic groups or sulfonic groups.

Besides, as water-soluble dyes for controlling the hue of a pigment ink on a recorded medium, water-soluble acidic dyes, direct dyes, reactive dyes and such like described in the Color Index are specifically usable.

Besides, even if not described in the Color Index, specific examples of dyes as illustrated below are usable without any problem. For example, dyes, only if containing a carboxylic group as solubilizing group, are also effective in further promoting the migration resistance. Their specific examples will be described below.

If ink containing at least one COOH group or COSH group is used to form an image, an excellent water-proofness is obtained with only a small amount being used. Any dye containing at least one COOH group or COSH group would be available, but preferable examples of dyes are mentioned as represented by the following structural formulae (a) to (e). Particularly the exemplified compounds 1 to 33 are preferably used in the present invention. Incidentally, among the dyes of the following structural formulae (a) to (e) and belonging to the exemplified compounds 1 to 33, those having at least one of COOH and COSH groups in the form of ammonium salt are preferable in the ink, but the counter ion is not limited to an ammonium ion and any of the counter ions, such as sodium and lithium ions, which have so far been publicly known as those to anionic dyes, may be used.

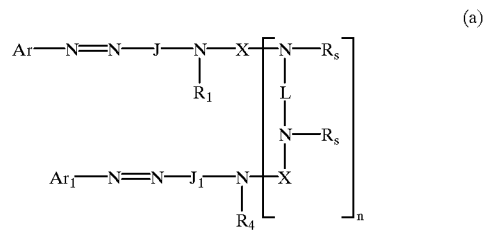

(a)

In this formula, Ar and Ar$_1$ are an aryl or substituted aryl group each, at least either of which has at least one substituent selected from COOH and COSH groups; J and J$_1$ are independently a coupling group represented by any of the following formulae (1) to (3) each; R$_1$, R$_2$, R$_3$ and R$_4$ are independently a hydrogen atom or an alkyl or substituted alkyl group each; L is a divalent coupling group; X is independently a carbonyl group or a coupling group represented by any of the following formulae (4) to (6).

The compound (a) has at least two groups selected from COOH and COSH groups if having no SO$_3$H group and has at least as many groups selected from COOH and COSH groups as the SO$_3$H group(s) if having SO$_3$H group(s).

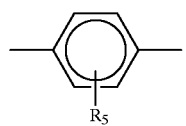

(1)

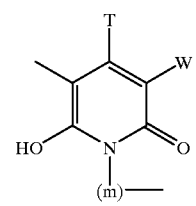

(2)

-continued

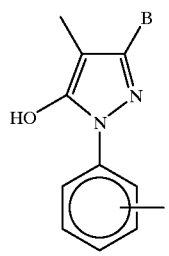

(3)

In these formulae, $R_5$ is selected independently from hydrogen alkyl, substituted alkyl, alkoxyhalogenide, CN, ureide and $NHCOR_6$ groups; $R_6$ is a hydrogen atom, or an alkyl, substituted alkyl, aryl, substituted aryl, aralkyl or substituted aralkyl group; T is independently an alkyl group; W is selected independently from a hydrogen atom, and a CN, $CONR_{10}R_{11}$, pyridinium and COOH groups; m is a $C_2$–$C_8$ alkylene chain; B is a hydrogen atom, or alkyl or COOH group; $R_{10}$ and $R_{11}$ are independently a hydrogen atom or an alkyl or substituted alkyl group each.

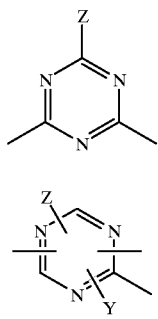

(4)

(5)

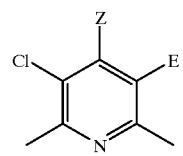

(6)

In these formulae, Z is $OR_7$, $SR_7$ or $NR_8R_9$; Y is a hydrogen or chlorine atom or a CN group; $R_7$, $R_8$ and $R_9$ are independently a hydrogen atom or an alkenyl, substituted alkenyl, alkyl, substituted alkyl, aryl, substituted aryl, aralkyl or substituted aralkyl group each, or alternatively $R_8$ and $R_9$ alone may form a pentacyclic or hexacyclic ring together with a nitrogen atom connected therewith.

In the case when the compound (a) has no $SO_3H$ group, there is provided any group selected from at least two COOH groups and COSH groups. On the other hand, in the case when the compound (a) has $SO_3H$ group, the number of the groups selected from COOH group and COSH group is at least the same as the number of $SO_3H$ groups.

Among the compounds represented by the general formula (a), compounds with substituents in which each of Ar and $Ar_1$ is an aryl group or substituted aryl group having at least one carboxyl group, J and $J_1$ are a group represented by the above formula (1) or (2) each and X is a compound represented by the above formula (4) or (5).

Further preferred specific examples of compounds represented by the general formula (a) will be shown below.

Exemplified Compound 1

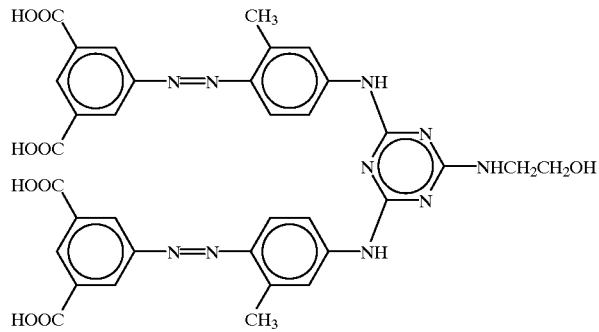

Exemplified Compound 2

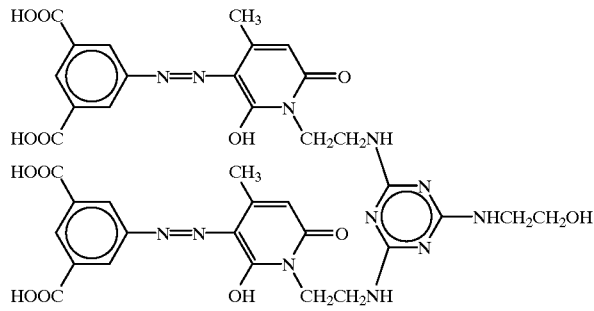

Exemplified Compound 3
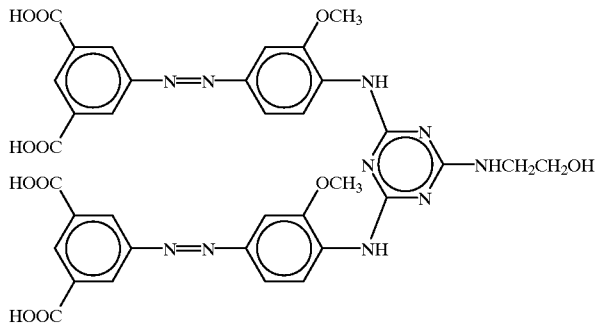
Exemplified Compound 4
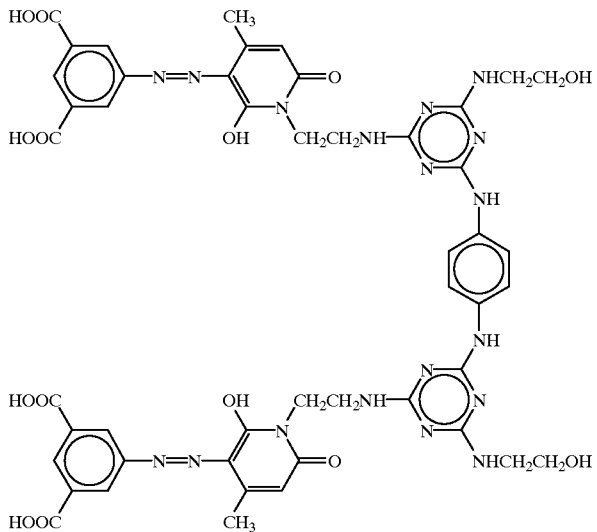
Exemplified Compound 5
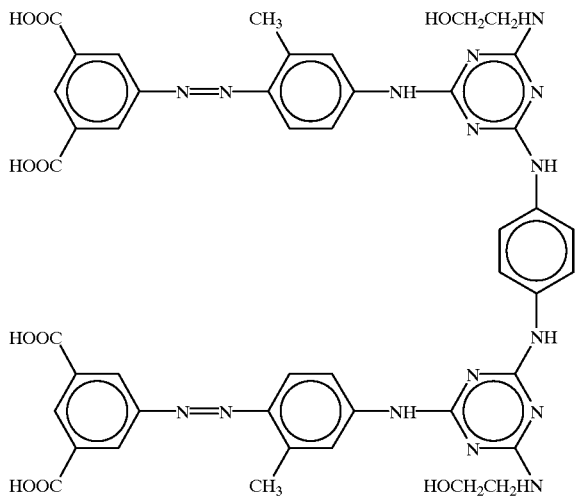
Exemplified Compound 6
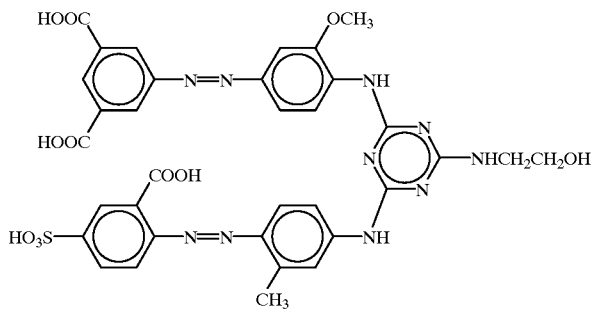
Exemplified Compound 7
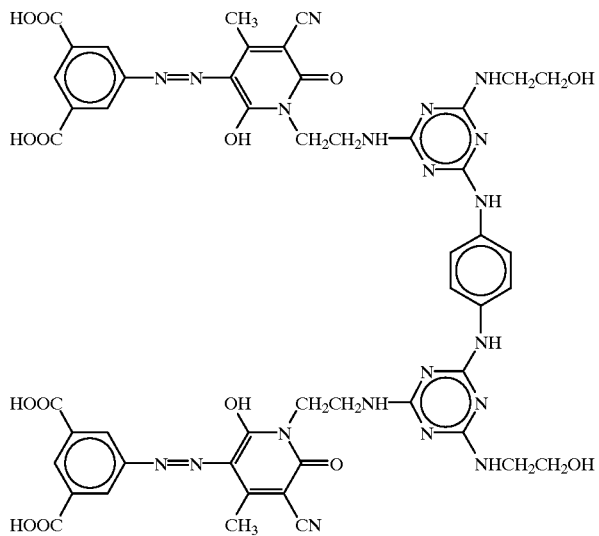
Exemplified Compound 8
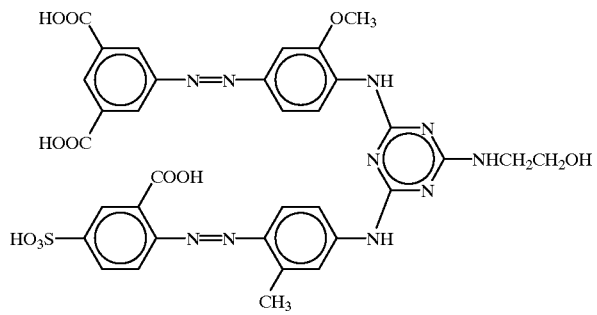

Exemplified Compound 9

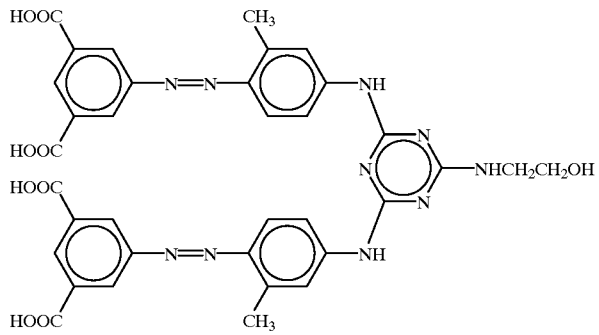

Exemplified Compound 10

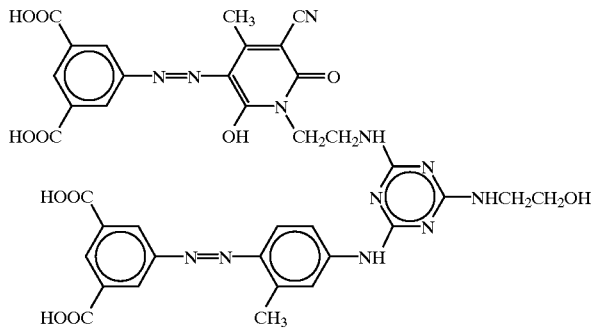

Exemplified Compound 11

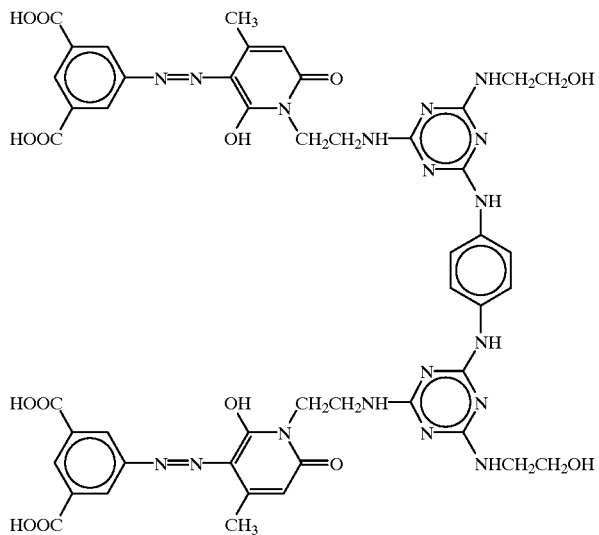

Exemplified Compound 12

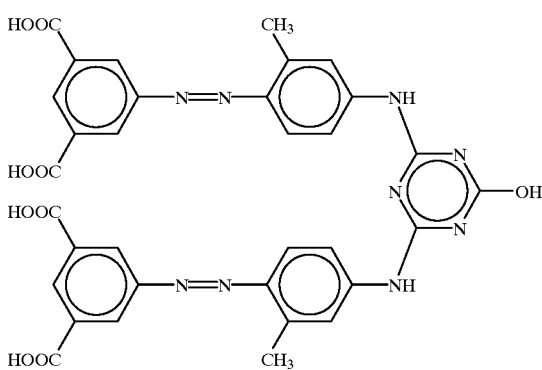

Exemplified Compound 13

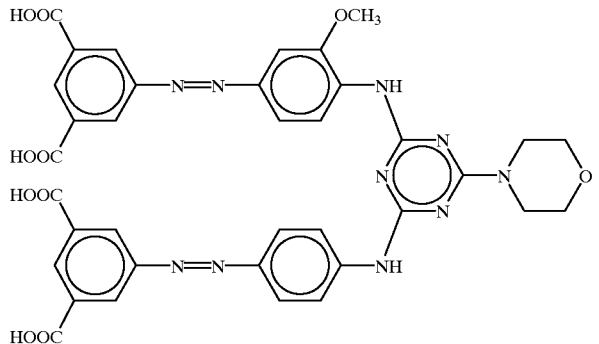

$$Ar_1-N=N-J-X-(NR_1-L-NR_2-X)_n-J-N=N-Ar_2 \quad (b)$$

In this formula, J is represented by the following formula; $Ar_1$ and $Ar_2$ are an aryl or substituted aryl group each, at least either of which has at least one substituent selected from COOH and COSH groups; $R_1$ and $R_2$ are independently a hydrogen atom or an alkyl, substituted alkyl, alkenyl or substituted alkenyl group each; L is a divalent coupling group; n is 0 or 1; X is independently a carbonyl group or a coupling group represented by any of the following formulae (1) to (3). The compound (b) has at least as many groups selected from COOH and COSH groups as $SO_3H$ group(s).

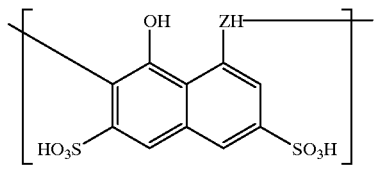

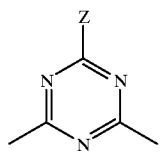

(1)

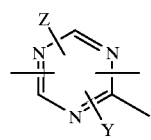

(2)

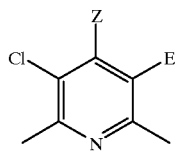

(3)

In these formulae, Z is independently $NR_3R_4$, $SR_5$ or $OR_5$; Y is a hydrogen or chlorine atom, Z, $SR_6$ or $OR_6$; E is independently a chlorine atom or a CN group; $R_3$, $R_4$, $R_5$ and $R_6$ are independently a hydrogen atom or an alkyl, substituted alkyl, alkenyl, substituted alkenyl, aryl, substituted aryl, aralkyl or substituted aralkyl group each, or alternatively $R_3$ and $R_4$ alone may form a pentacyclic or hexacyclic ring together with a nitrogen atom connected therewith.

Among the compounds represented by the general formula (b), compounds with substituents in which each of Ar and $Ar_1$ is an aryl group or substituted aryl group having at least one carboxyl group and X is a carbonyl group or a compound with a group represented by the above formula (1) or (2). Further preferred specific examples of compounds represented by the general formula (b) will be shown below.

Exemplified Compound 14

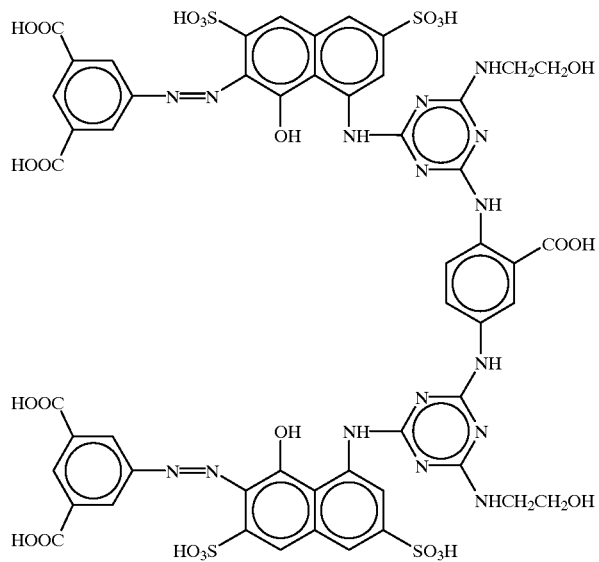

Exemplified Compound 15

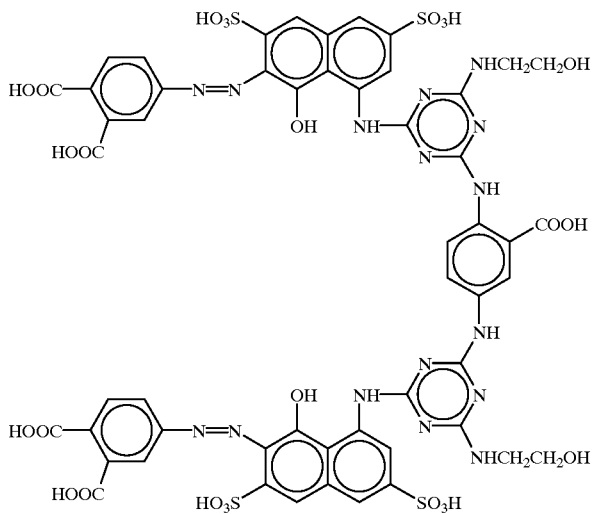

Exemplified Compound 16
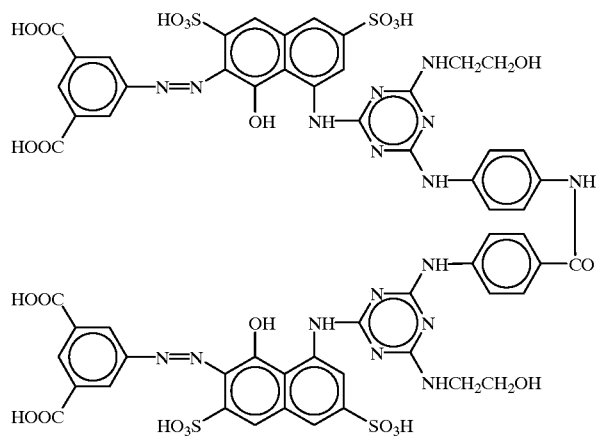
Exemplified Compound 17
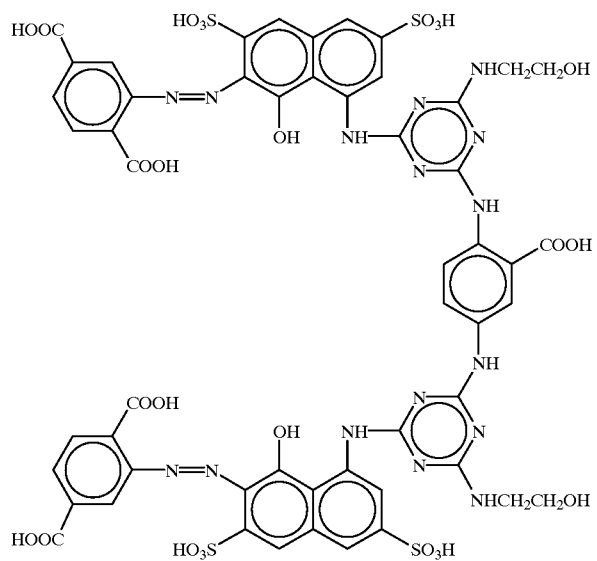
Exemplified Compound 18
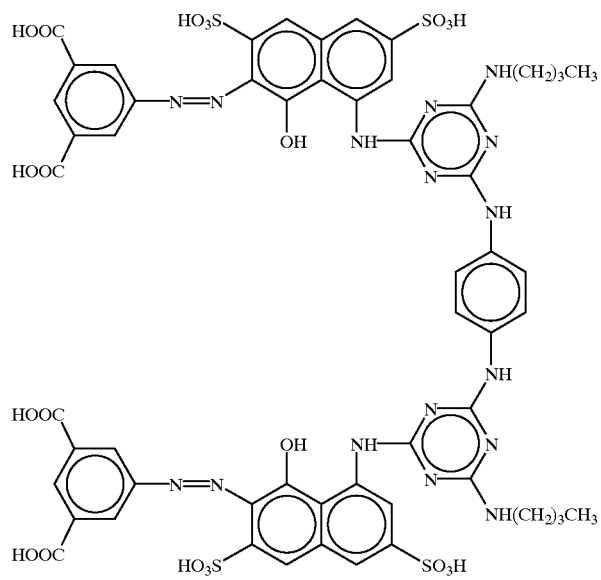
Exemplified Compound 19
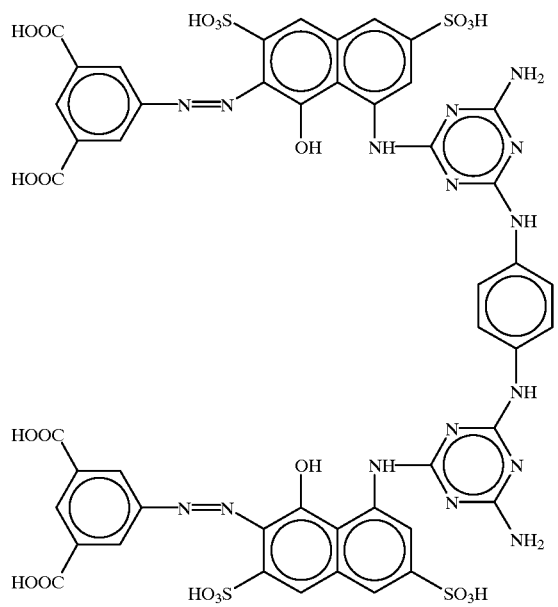

Exemplified Compound 20

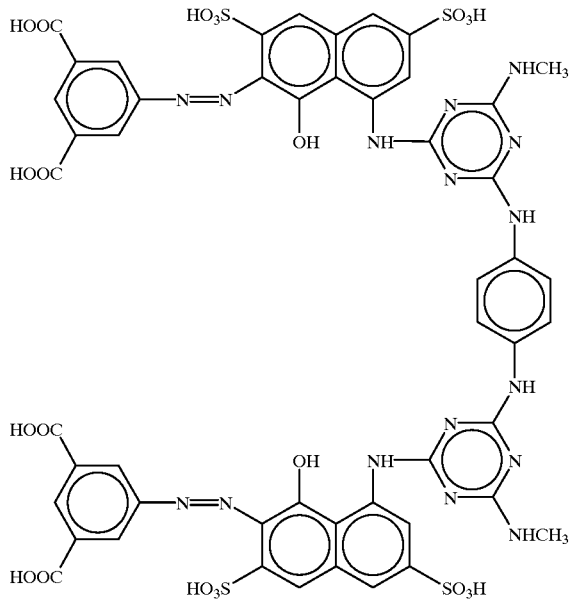

Exemplified Compound 21

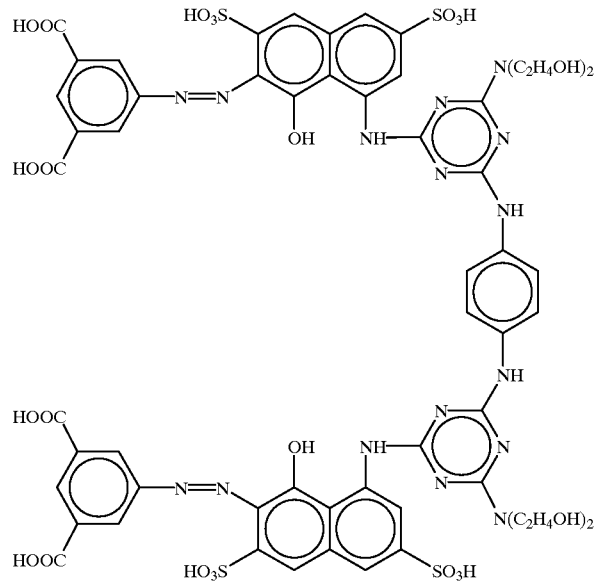

$$Pc(SO_3H)_t(SO_2-NR_1-L-NR_2-X-NR_3-G)_q \quad (c)$$

In this formula, Pc is a metal-containing phthalocyanine nucleus; $R_1$, $R_2$ and $R_3$ are independently a hydrogen atom or an alkyl, substituted alkyl, alkenyl, substituted alkenyl, aralkyl or substituted aralkyl group each; L is a divalent coupling group; X is independently a carbonyl group or a coupling group represented by any of the following formulae (1) to (3); (t+q) is equal to 3 to 4. The compound (c) has as many groups selected from COOH and COSH groups as at least one or more $SO_3H$ groups.

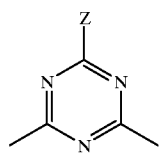 (1)

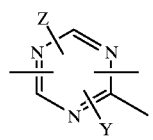 (2)

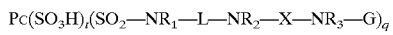 (3)

In these formulae, Z is independently $NR_4R_5$, $SR_6$ or $OR_6$; Y is independently a hydrogen or chlorine atom, Z, $SR_7$ or $OR_7$; E is independently a chlorine atom or a CN group; $R_4$, $R_5$, $R_6$ and $R_7$ are independently a hydrogen atom or an alkyl, substituted alkyl, aryl, substituted aryl, aralkyl or substituted aralkyl group each, or alternatively $R_4$ and $R_5$ alone may form a pentacyclic or hexacyclic ring together with a nitrogen atom connected therewith; E is a colorless organic group substituted with one or two groups selected from COSH and COOH groups.

Among the compounds represented by the general formula (c), compounds with substituents in which X is a carbonyl group or a compound with a group represented by the above formula (1) or (2) and G is a compound with at least one of the carboxylic groups being substituted. Further preferred specific examples of compounds represented by the general formula (c) will be shown below.

Exemplified Compound 22

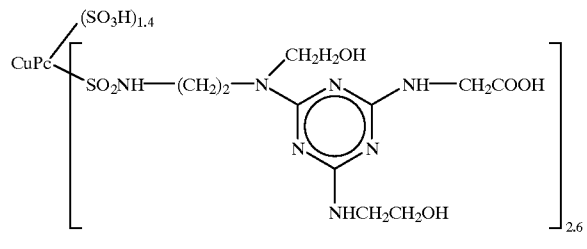

Exemplified Compound 23

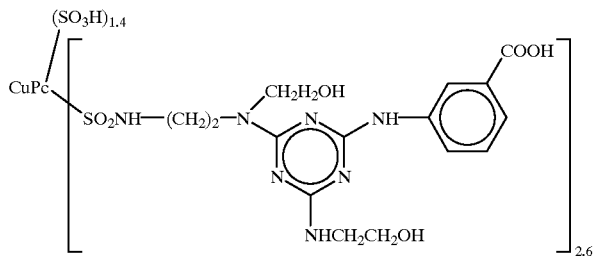

Exemplified Compound 24

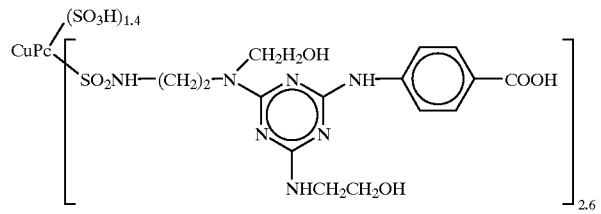

Exemplified Compound 25

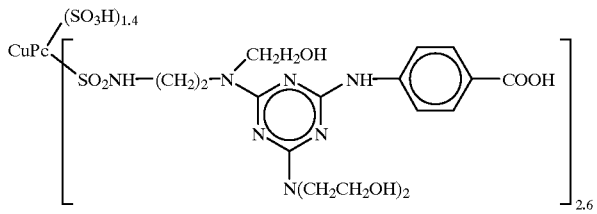

Exemplified Compound 26

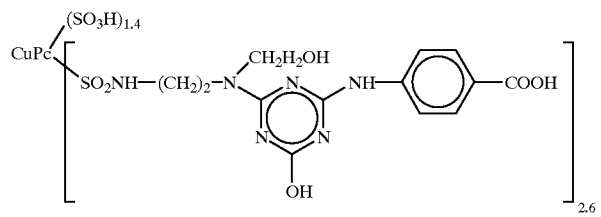

Exemplified Compound 27

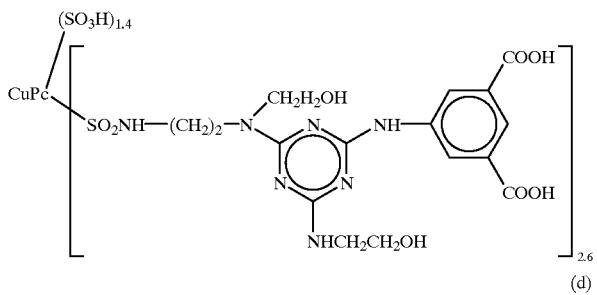

Exemplified Compound 28

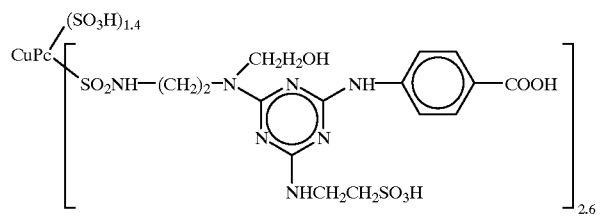

(d)

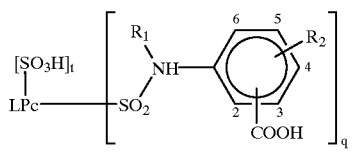

In this formula, L is a metal cation or a hydrogen atom; Pc is a tri- or tetra-valent phthalocyanine nucleus, $R_1$ is a hydrogen atom or an alkyl, substituted alkyl alkenyl, substituted alkenyl, aralkyl or substituted aralkyl group and $R_2$ is a hydrogen atom, an alkyl, alkoxy group, a halogen atom or any substituted amino group; (t+q) is equal to 3 to 4; a COOH group is attached to the 2, 3, 5 or 6 position in formula (d).

Further preferred specific examples of compounds represented by the general formula (d) will be shown below.

Exemplified Compound 29

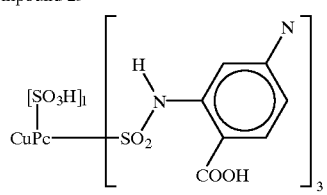

-continued

Exemplified Compound 30

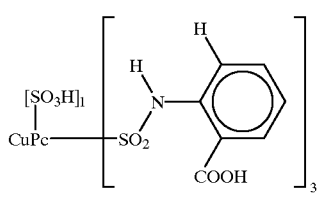

Exemplified Compound 31

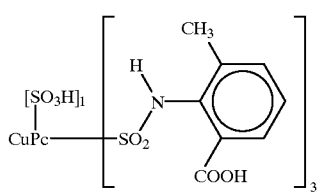

-continued

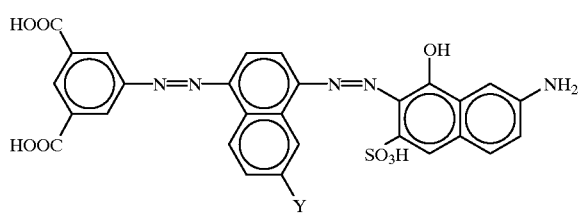

(e)

In this formula, Y is a hydrogen atom or an SO₃H group.
Further preferred specific examples of compounds represented by the general formula (e) will be shown below.

Exemplified Compound 32

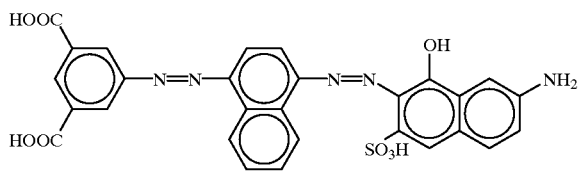

Exemplified Compound 33

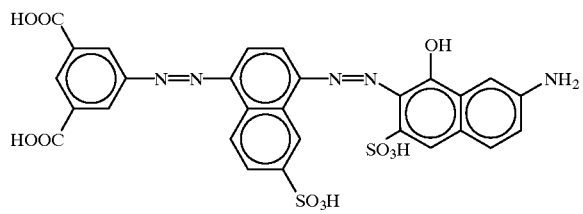

Next, water-soluble organic solvents used preferably in the present invention will be described.

In the present invention, a preferred water-soluble organic solvent is glycerol and it may be added in an amount ranging preferably from 2% to 30% by weight and more preferably from 5% to 15% by weight of the ink. Another preferred water-soluble organic solvent is a solvent containing glycerol and diethylene glycol or ethylene glycol. Similarly, the amount of this solvent mixture to be added also ranges preferably from 2% to 30% by weight and more preferably from 5% to 15% by weight in ink. These solvents comprising glycerol and a mixture of glycerol and diethylene glycol or ethylene glycol can be further mixed with other water-soluble organic solvents for use in the invention. In this case, the total amount of water-soluble organic solvents in the ink ranges preferably from 2% to 60% by weight and more preferably from 5% to 25% by weight relative to the total weight of the ink.

Other examples of water-soluble solvents used in the present invention may include $C_1$–$C_4$ alkyl alcohols such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or keto-alcohols such as acetone or diacetone alcohol; ethers such as tetrahydrofuran and dioxane; polyalkylene glycols such as polyethylene glycol and polypropylene glycol; $C_2$–$C_6$ alkylene glycols such as ethylene glycol, propylene glycol, butylene glycol, triethylene glycol, 1,2,6-hexanetriol, thiodiglycol, hexylene glycol, and diethylene glycol; alkyl ethers of polyhydric alcohols such as ethylene glycol methyl ether, ethylene glycol ethyl ether, triethylene monomethyl ether and triethylene glycol monoethyl ether; N-methyl-2-pyrrolidone; 2-pyrrolidone; and 1,3-dimethyl-2-imidazolidinone, but are not limited to these.

In addition to the coloring materials and water-soluble solvents mentioned above, a surfactant, a defoaming agent, a pH controlling agent, antiseptics or the like may be added timely to regulate the characteristics of the ink.

The surface tension of the ink ranges preferably from 15 dyn/cm to 60 dyn/cm and more preferably from 20 dyn/cm to 50 dyn/cm.

Recorded media used in a recording method according to the present invention are not especially restricted, but plain paper such as copy sheet and bond paper, coated paper prepared especially for ink-jet recording, glossy paper, an OHP film and such are preferably used. Among these, using a recording medium with an ink receptor layer provided on a light transmissible substrate is preferable for the most effective implementation of the present invention. Furthermore, use of a recording medium that further protects a recorded image by melting a fusible layer provided on the ink receptor layer upon heating after the printing, thus improving the water-proofness and scratch resistance, would be preferable.

Figure 2:
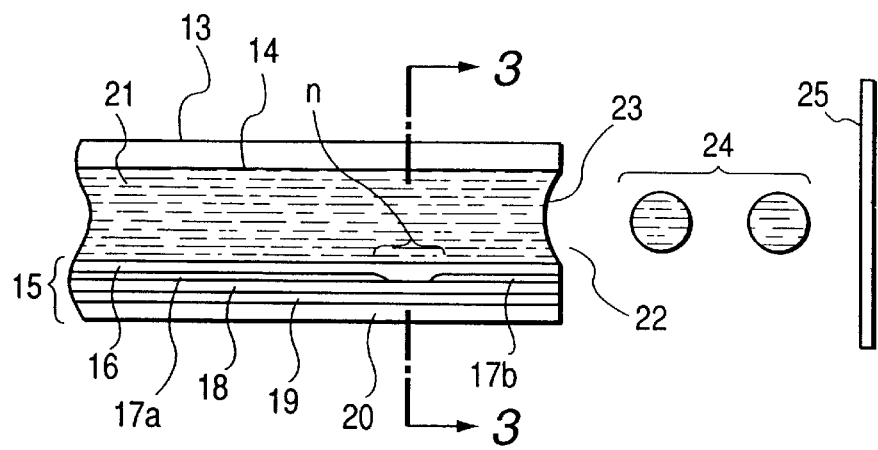
FIG. 2 is a vertical sectional view of a head of an ink-jet recorder according to the present invention.
Figure 3:
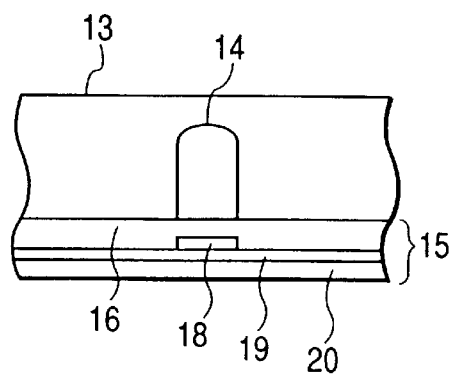
FIG. 3 is a horizontal sectional view of a head of the ink-jet recorder according to the present invention.
Figure 4:
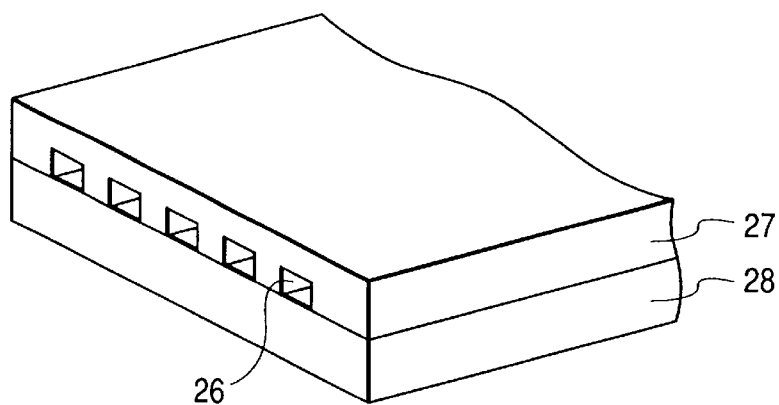
FIG. 4 is an external perspective view of a head multiplexed from head arrays as shown in FIG. 1.

Next, one example of an ink jet recorder appropriate to an ink-jet recording method according to the present invention will be described below. An example of a head arrangement forming the principal part of the recorder is shown in FIGS. 2, 3 and 4. The head is obtained by fitting glass, ceramic, plastic or the like having a groove 14 through which ink passes to an exothermic head 15. The exothermic head comprises a protective layer 16 formed of silicon oxide or the like, an exothermic resistor layer 18 formed of aluminum electrodes 17a and 17b, a nichrome wire or the like, a heat storing layer 19 and a heat-dissipating substrate 20 made of aluminum or the like. An ejection orifice 22 is filled with the ink 21, and a meniscus 23 is formed due to pressure.

When an electric signal is applied to the electrodes 17a and 17b, the region designated with n in the exothermic head 15 is heated abruptly, and bubbles are generated in the ink adjacent thereto, so that the meniscus 23 protrudes under their pressure and ink 21 is ejected through the orifice 22, changes into small recording drops 24 and flies toward a recording sheet 25. FIG. 4 is an external view of a multi-head in which many heads as shown in FIG. 2 are arrayed. This multi-head is fabricated by bringing a glass pane 27 with a multi-groove 26 into close contact with an exothermic head 28 similar to that illustrated in FIG. 2. Incidentally, FIGS. 2 and 3 are a sectional view of a head taken along the ink flowing passage and a sectional view of the head shown in FIG. 2 taken along line 3—3.

Figure 5:
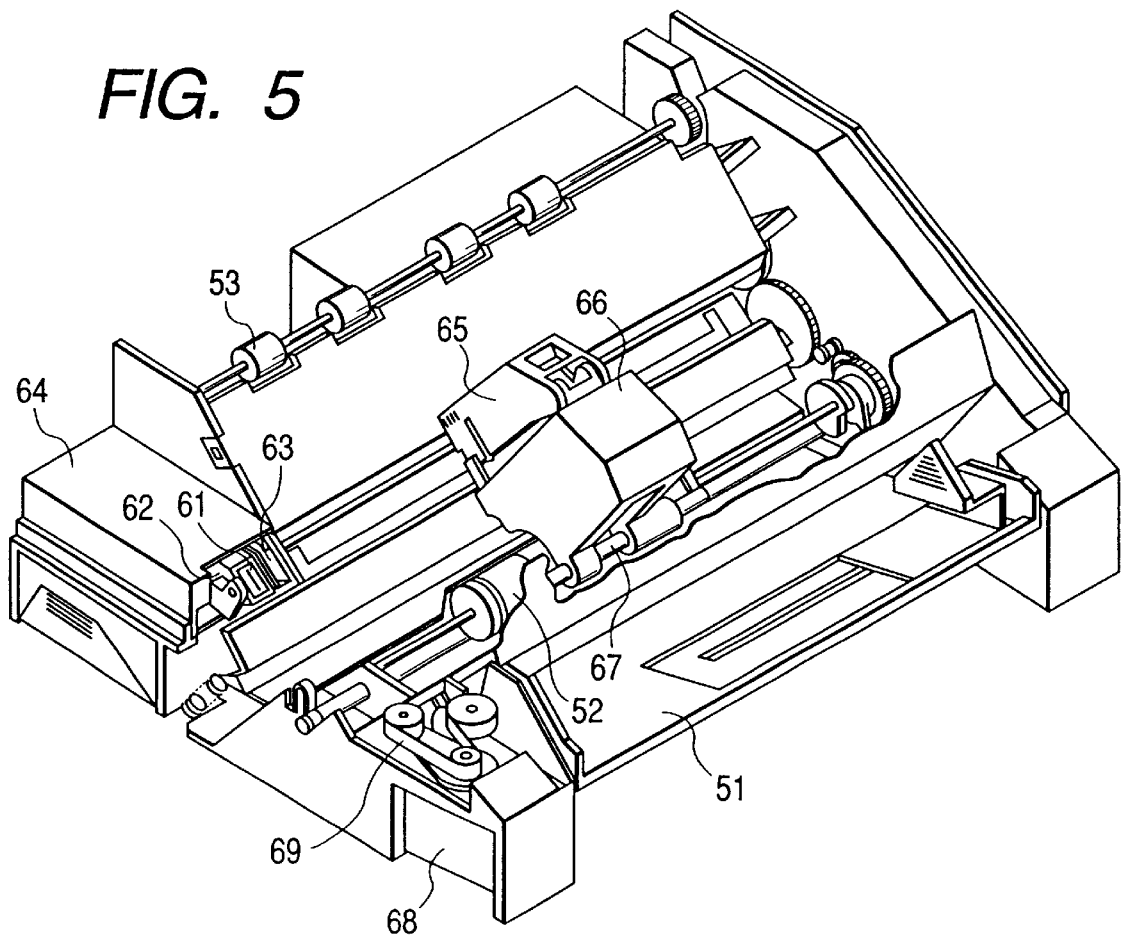
FIG. 5 is a perspective view showing one example of ink-jet recorder.

FIG. 5 shows one example of an ink-jet recorder with such a head incorporated. In FIG. 5, a blade 61 serving as a wiping member has a cantilever shape with its one end retained by a blade retaining member. The blade 61 is disposed at a position adjacent to the recording region in conjunction with a recording head and is retained in such a way as to protrude into the moving path of the recording head in the case of this example. A cap 62 is disposed at the home position adjacent to the blade 61 and is so arranged as to move perpendicularly to the moving direction of the recording head, butt against the ejecting outlet face and perform capping. Furthermore, as with the blade 61, an ink absorber 63, provided adjacent to the blade 61, is retained in such a way as to protrude into the moving path of the recording head as in the case of the blade 61. An ejection recovery part 64 comprises the blade 61, cap 62 and absorber 63 mentioned above, while removal of moisture and dust on the ink ejection outlet face is carried out by means of the blade 61 and absorber 63.

A recording head 65 has ejection energy generating means and ejects ink to the recording medium opposed to the ejection outlet face provided with an ejection outlet and a carriage 66, serving to carry and move the recording head 65, is mated slidably with the guide shaft 67 and a part (not shown) of the carriage 66 is connected to a belt 69 driven by a motor 68. Thereby, the movement of the carriage 66 along the guide shaft 67 is enabled and the recording head 65 can move to the recording region and its adjacent region.

Numerals 51 and 52 denote a paper feed section for inserting a recording medium and a paper feed roller driven by an unshown motor. With such an arrangement, a recording medium is fed to a position opposed to the ejection outlet face and is discharged by means of the paper feed roller 53 with the progress of recording. In the above arrangement, the cap 62 of the head recovery section 64 is receded from the moving path of the recording head 65 at the time of return to the home position after the completion of recording or the like, but the blade protrudes into the moving path. As a result, the ejection face of the recording head 65 is wiped. Incidentally, in butting against the ejection outlet face of the recording head 65 for capping, the cap 62 moves in such a manner as to protrude into the moving path of the recording head 65.

When the recording head 65 moves from the home position to the recording start position, the cap 62 and the blade 61 are situated at the same position as with the wiping. As a result, the ejection outlet face of the recording head 65 is also wiped in this move.

Not only at the completion of recording and the restoration of ejection but also during the movement of the head within the recording region for recording, the recording head 65 moves to the home position adjacent to the recording region at predetermined intervals and the above wiping is executed with this movement.

EMBODIMENTS

Hereinafter, referring to embodiments, the present invention will be described.

Embodiment 1

The ingredients mentioned below were mixed to prepare 4 types of dye ink (ink 1-A, B, C and D) different in coloring material concentration. Incidentally, ink 1-D is one containing carbon black for increasing the maximum density (also in the Embodiments 2 to 4 mentioned below, ink *-D is one for increasing the maximum density).

TABLE 1

|  | 1-A | 1-B | 1-C | 1-D |
| --- | --- | --- | --- | --- |
| Carbon Black |  |  |  | Cabo-Jet 200 (made by Cabot Co.) 3 wt. % |
| FB-2 | 6 wt % | 3 wt % | 1.5 wt % |  |
| Glycerol | 10 wt % | 10 wt % | 10 wt % | 10 wt % |
| Ethylene Glycol | 10 wt % | 10 wt % | 10 wt % | 10 wt % |
| Water | Remainder | Remainder | Remainder | Remainder |

FB-2: C.I. FOOD BLACK 2

Embodiment 2

The ingredients shown in the Table 2 mentioned below were mixed to prepare 4 types of dye ink (ink 2-A, B, C and D) different in coloring material concentration.

TABLE 2

|  | 2-A | 2-B | 2-C | 2-D |
| --- | --- | --- | --- | --- |
| Carbon Black |  |  |  | Cabo-Jet 200 (made by Cabot Co.) 3 wt. % |
| DBK195 | 4 wt % | 2 wt % | 1 wt % |  |
| Exemplified Compound 22 | 2 wt % | 1 wt % | 0.5 wt % |  |
| Glycerol | 10 wt % | 10 wt % | 10 wt % | 10 wt % |
| Ethylene Glycol | 10 wt % | 10 wt % | 10 wt % | 10 wt % |
| Water | Remainder | Remainder | Remainder | Remainder |

DBK195: C.I. DIRECT BLACK 195

Embodiment 3

The ingredients mentioned below were mixed to prepare 4 types of dye ink (ink 3-A, B, C and D) different in coloring material concentration.

TABLE 3

|  | 3-A | 3-B | 3-C | 3-D |
| --- | --- | --- | --- | --- |
| Carbon Black |  |  |  | Cabo-Jet 300 (made by Cabot Co.) 3 wt. % |
| FB-2 | 6 wt % | 3 wt % | 1.5 wt % |  |
| Glycerol | 10 wt % | 10 wt % | 10 wt % | 10 wt % |
| Ethylene Glycol | 10 wt % | 10 wt % | 10 wt % | 10 wt % |
| Water | Remainder | Remainder | Remainder | Remainder |

Embodiment 4

The ingredients shown in the Table 4 mentioned below were mixed to prepare 4 types of dye ink (ink 4-A, B, C and D) different in coloring material concentration.

TABLE 4

|  | 4-A | 4-B | 4-C | 4-D |
| --- | --- | --- | --- | --- |
| Carbon Black |  |  |  | Cabo-Jet 300 (made by Cabot Co.) 3 wt. % |
| DBK195 | 4 wt % | 2 wt % | 1 wt % |  |
| Exemplified Compound 22 | 2 wt % | 1 wt % | 0.5 wt % |  |
| Glycerol | 10 wt % | 10 wt % | 10 wt % | 10 wt % |
| Ethylene Glycol | 10 wt % | 10 wt % | 10 wt % | 10 wt % |
| Water | Remainder | Remainder | Remainder | Remainder |

Comparative Example 1

In place of ink D in Embodiment 1, ink comprising 3 wt. % of FB-2, 10 wt. % of glycerol, 10 wt. % of ethylene glycol and the remainder being water was employed as ink D.

<Evaluation>

Inks of the individual Embodiments and Comparative Example 1 were filled in the Bk, Y, M and C tanks of a color ink-jet printer BJC-600J made by Canon, Inc. in the sequence of decreasing color concentration to make a print on an OHP sheet CF-301 made by Canon, Inc. with 200% duty printing comprising 100% duty printing for inks A, B and C first and 100% duty printing for ink D as superimposed. Besides, apart from these prints, the respective 100% duty printing of ink A, B, C and D was executed as the overlap of 4 colors to form a mixed ink image at the maximum ink struck portion.

In evaluating each type of ink, the maximum image density was indicated with the measured value of mixed ink transmissible density in the maximum ink struck portion. Besides, concerning the gradation, the O.D. (Optical Density) of inks A, B, C and A+D was measured individually and the relationship between the ink struck amount and O.D. was plotted to determine the linearity between them. On the basis of correlation coefficients obtained by the approximation using lines passing through the origin, those of 0.9 and higher were designated with O and those of 0.8 and lower were designated with x. The results are shown in Table 5.

TABLE 5

|  | Max. Image Density | Gradation (Linearity) |
|---|---|---|
| Embodiment 1 | 3.5 | o |
| Embodiment 2 | 3.2 | o |
| Embodiment 3 | 3.6 | o |
| Embodiment 4 | 3.4 | o |
| Comparative Example 1 | 2.3 | x |

As evident from the results shown in Table 5, Embodiments 1 to 4 were good in maximum image density and gradation, whereas Comparative Example 1 did not rise much in maximum image density and gave no linear γ-characteristic to the ink amount and the struck amount concerning the gradation also.

Incidentally, the scattering degree of ink used in the above Embodiments to light was examined by using the Haze degree as index as follows.

(1) Haze degree=(Diffuse Transmittance/Total Transmittance)* 100 (%)

(2) Measuring Device Employed:

Direct Reading Haze Meter, made by TOYO SEIKI Co., Ltd.

With respect to the haze degree of the inks according to the Embodiments, printing was made by changing the printing duty so that a light transmissible image O.D. value becomes 1 to 1.2 to measure the haze degree. The results are shown in Table 6.

TABLE 6

| Ink | Pigment Ink according to Embodiments 1 and 2 | | | Pigment Ink according to Embodiments 3 and 4 | | |
|---|---|---|---|---|---|---|
| Haze Degree | 30 | | | 32 | | |
| Ink | 1-A | 1-B | 1-C | 2-A | 2-B | 2-C |
| Haze Degree | 9 | 8 | 8 | 11 | 10 | 9 |

Incidentally, dye ink according to Embodiment 3 and dye ink according to Embodiment 1 are identical in composition, while dye ink according to Embodiment 4 and dye ink according to Embodiment 2 are identical in composition.

As described above, according to the present invention, an ink-jet record that is high in transmissible image density and maximum image density, good in hue and excellent in gradation is provided.

What is claimed is:

1. An ink-jet recording method using diverse concentrations of ink to make a graded record, comprising the steps of:

preparing a first type of ink containing a dye for performing said graded recording and a second type of ink containing a pigment for further increasing the maximum density expressible with the first type of ink on a recording medium; and forming a portion having the maximum density on the recording medium by causing said first type of ink containing a dye and said second type of ink containing a pigment to overlap.

2. The ink-jet recording method as set forth in claim 1, wherein said first type of ink includes diverse concentrations of black ink and said second type of ink includes black ink.

3. The ink-jet recording method as set forth in claim 1, wherein said second type of ink is higher in scattering power of light than said first type of ink.

4. The ink-jet recording method as set forth in claim 3, wherein said recording medium transmits light.

5. The ink-jet recording method as set forth in claim 1, wherein thermal energy is used to eject ink.

6. An ink-jet recording apparatus for making a graded record by using diverse concentrations of ink, comprising:

first ink attaching means for attaching a first type of ink used for said graded recording, said first type of ink containing a dye;

second ink attaching means for attaching a second type of ink containing a coloring material different from that of said first type of ink, for further increasing the maximum density expressible with the first type of ink on a recording medium, said second type of ink containing a pigment; and recording control means for controlling said first type of ink containing a dye and said second type of ink containing a pigment to overlap so as to form a portion having the maximum density on the recording medium.

7. The ink-jet recording apparatus as set forth in claim 6, wherein said first type of ink includes diverse concentrations of black ink and said second type of ink includes black ink.

8. The ink-jet recording apparatus as set forth in claim 6, wherein said second type of ink is higher in scattering power of light than said first type of ink.

9. The ink-jet recording apparatus as set forth in claim 8, wherein said recording medium transmits light.

10. The ink-jet recording apparatus as set forth in claim 6, wherein thermal energy is used to eject ink.

11. The ink-jet recording method according to claim 1, further comprising a step of forming a portion other than the portion having the maximum density, by using only said first type of ink containing a dye.

12. The ink-jet recording apparatus as set forth in claim 6, wherein said recording control means is adapted to form a portion other than the portion having the maximum density, by using only said first type of ink containing a dye.

13. An ink-jet recording method using diverse concentrations of black ink to make a graded record, comprising the steps of:

preparing a first type of black ink containing a dye for performing said graded recording and a second type of black ink containing a pigment for further increasing the maximum density expressible with the first type of ink on a recording medium, and forming (1) a first portion where said first type of black ink containing a dye and said second type of black ink containing a pigment overlap and (2) a second portion composed of only said first type of black ink containing a dye, and having a density lower than that of said first portion.

14. An ink-jet recording apparatus for making a graded record by using diverse concentrations of black ink, comprising:

ink applying means for applying a first type of black ink containing a dye for performing said graded recording and a second type of black ink containing a pigment for further increasing the maximum density expressible with the first type of ink on a recording medium, and forming means for forming (1) a first portion where said first type of black ink containing a dye and said second type of black ink containing a pigment overlap and (2) a second portion composed of only said first type of black ink containing a dye, and having a density lower than that of said first portion.

15. A record comprising a recording medium on which an image is recorded which has a portion having a maximum density where a first type of black ink containing a dye for performing graded recording and a second type of black ink containing a pigment for further increasing the maximum density expressible with the first type of ink on the recording medium overlap.

16. A record comprising a recording medium on which an image is recorded which has (1) a first portion where a first type of black ink containing a dye for performing graded recording and a second type of black ink containing a pigment for further increasing the maximum density expressible with the first type of ink on a recording medium overlap and (2) a second portion composed of only said first type of black ink containing a dye, and having a density lower than that of said first portion.

\* \* \* \* \*